US00RE39540E

(19) United States
(12) Reissued Patent
Sokolov et al.

(10) Patent Number: US RE39,540 E
(45) Date of Reissued Patent: Apr. 3, 2007

(54) CELLULAR TELEPHONY SEARCHER

(75) Inventors: Dotan Sokolov, Ra'anana (IL); David Ben-Eli, Modiin (IL)

(73) Assignee: Intel Corporation, Santa Clara, CA (US)

(21) Appl. No.: 10/691,432

(22) Filed: Oct. 23, 2003

Related U.S. Patent Documents

Reissue of:
(64) Patent No.: 6,307,878
Issued: Oct. 23, 2001
Appl. No.: 09/324,515
Filed: Jun. 3, 1999

(51) Int. Cl.
*H04B 1/69* (2006.01)

(52) U.S. Cl. ..... 375/150; 375/144
(58) Field of Classification Search ..... 375/150, 375/130, 142, 144, 148, 343, 367; 370/342
See application file for complete search history.

(56) References Cited

U.S. PATENT DOCUMENTS 5,157,408 A * 10/1992 Wagner et al. ..... 342/399
5,216,693 A * 6/1993 Nakamura
5,222,100 A 6/1993 Lundquist et al.
5,251,238 A * 10/1993 Menk et al. ..... 375/355
5,396,515 A * 3/1995 Dixon et al.
5,495,499 A * 2/1996 Fenton et al. ..... 370/479
5,809,064 A * 9/1998 Fenton et al.
5,978,412 A * 11/1999 Tukai

OTHER PUBLICATIONS

EP Application No.: 05 009 051.3–1246 Office Action dated Mar. 22, 2006.

* cited by examiner

*Primary Examiner*—Khai Tran
(74) *Attorney, Agent, or Firm*—Michael A. Proksch

(57) ABSTRACT

A searcher for a mobile station of a cellular telephony network. Pilot signal from nearby base stations are correlated with a pseudonoise sequence inside a search window, using a bank of correlators. Each correlator is assigned a different delay, from among a sequence of delays in the window. At each delay, correlation is performed initially for a first dwell time. If the resulting correlation value exceeds a threshold, the correlation is continued for a second dwell time. Otherwise, the correlator is set to the next delay in the sequence. Only the outputs of second dwell correlations are used to identify the nearest base station. Some correlators may perform first dwell correlations at new delays in the window at the same time that other correlators are still performing second dwell correlations at old delays in the window.

47 Claims, 3 Drawing Sheets

CELLULAR TELEPHONY SEARCHER

Matter enclosed in heavy brackets [ ] appears in the original patent but forms no part of this reissue specification; matter printed in italics indicates the additions made by reissue.

FIELD AND BACKGROUND OF THE INVENTION

The present invention relates to cellular telephony and, more particularly, to a searcher for a DSSS cellular telephony system.

In a DSSS cellular telephony system, the base stations identify themselves by transmitting pilot signals. Each pilot signal is a sequence of zero bits, modulated, according to the principles of DSSS encoding, by a pseudonoise (PN) sequence, or an extended pseudonoise sequence.

For example, under the IS-95 interim standard, the PN sequence is $2^{15}$ chips long, with the n-th chip including an in-phase component i(n) and a quadrature component q(n). The initial values of i and q are i(1)=q(1)=1 and i(n)=q(n)=0 for $2 \leqq n \leqq 15$. Subsequent values of i and q, up to $n=2^{15}-1$, are obtained recursively as follows:

$$i(n)=i(n-15)+i(n-10)+i(n-8)+i(n-7)+i(n-6)+i(n-2) \quad (1)$$

$$q(n)=q(n-15)+q(n-12)+q(n-11)+q(n-10)+q(n-b\ 9)+q(n-5)+q(n-4)+q(n-3) \quad (2)$$

where the additions are modulo 2. Finally, $i(2^{15})=q(2^{15})=0$.

The same PN sequence is used by each of the base stations. The base stations are synchronized; and each base station uses the PN sequence with a different delay (also called "PN offset") to produce the pilot signal. This enables the mobile units of the cellular telephony network to distinguish one base station from another.

The total signal received by a mobile station, as a function of time $t_s$ is:

$$RX(t) = \sum_{b=1}^{B} \sum_{m=1}^{M_b} C(b, m, t) \cdot PN(t + offset(b) + \tau(b, m)) \cdot \left[1 + \sum_{i=1}^{I_b} \alpha_i \cdot D(i, b, t) \cdot W(i, b)\right] + N \quad (3)$$

Here, b indexes the B base stations; m indexes the $M_b$ transmission paths (multipath channels) from base station b to the mobile station; C is the channel gain of multipath channel m; $\tau$ is the additional delay introduced to the PN sequence by multipath channel m; the "1" inside the brackets represents the sequence of zeros that is modulated by the base stations to produce the pilot signals; i indexes the $I_b$ other users that are transmitting via base station b at time t; $\alpha$ is the power of user i relative to the pilot signal; D is the data transmitted by user i; W is a code sequence (for example, a Hadamard code sequence) that is used in addition to the PN sequence to modulate data D and allow simultaneous transmission on the same physical channel by all the users in addition to the pilot signals; and N is additive noise.

Each mobile unit of the cellular telephony network determines which base station to communicate with (typically, the nearest base station) by correlating this signal with the PN sequence at a set of trial delays. Because data D are modulated by sequences W, the correlation of the part of the signal that comes from other users is negligible. The correlation with the pilot signals also is negligible, except at trial delays that are equal to the PN offsets used by the base stations, as modified by multipath delays $\tau$. Specifically, a pilot signal that arrives at a delay, that is equal to the sum of a base station offset and one of the multipath delays $\tau$ associated with transmissions from that base station, gives a significant contribution to the correlation at a matching trial delay; and all other pilot signals contribute negligibly to the correlation at that trial delay. This correlating is performed when the mobile station powers up, and continuously thereafter, to allow hand over from one base station to another when the mobile station crosses a call boundary. The delays of the various base stations are well separated, by more than the largest anticipated multipath delay, so in the absence of additive noise and in the absence of multipath delays, only a small number of correlations, equal to the number of potential nearest base stations, would have to be performed, to identify the base station whose delay gives the highest correlation as the nearest base station. According to the IS-95 standard, this separation is at least 256 chip duration $T_c$. Because the pilot signals and data D are received by the mobile station from each base station via several paths at different delays (PN offset+$\tau$), the various replicas of the signals thus received are combined to suppress the deterministic noise represented by the various multipath delays $\tau$. For example, maximal ratio combining is the optimal combination method in a bit error rate and frame error rate sense. In order to do this combining, the multipath delays must be determined. Therefore, the correlation is performed at a series of delays in a window centered on the nominal delay. The size of this window depends on the local topography, and is provided to the mobile unit by the base station. One typical window size, according to the IS-95 standard, is 60 chip durations.

FIG. 3 is a schematic block diagram of a mobile station receiver 30. RF signals are received by an antenna 60, down converted to an intermediate frequency (IF) by a down converter 62, filtered by a bandpass filter 64 (typically a surface acoustic wave filter) to eliminate signals outside the required bandwidth, and amplified by an automatic gain control 66. The amplified IF signals are multiplied by an IF sinusoid 65, without (block 68i) and with (block 68q) a 90° phase shift 67, to produce an in-phase signal I and a quadrature signal Q. In-phase signal I is filtered by a low-pass filter 70d and digitized by an A/D converter 72i. Similarly, quadrature signal Q is filtered by a low-pass filter 70q and digitized by an A/D converter 72q. A searcher 80 receives the digitized signals and performs the correlations needed to determine the various multipath delays $\tau$ inside the target window. The digitized signals are again correlated, at the delays determined by searcher 80, by the correlators of a correlator bank 74, and the outputs of correlator bank 74 are combined, in a maximal ratio sense, in a rake combiner 76 to produce the final output signal.

In order to ensure uninterrupted communication as a mobile station crosses from one cell to another, the correlations performed by searcher 80 must be performed rapidly. In fact, it is not necessary to perform the full correlation at each delay in the window. It suffices to perform a correlation that is only long enough to ensure a high detection probability at the right delay and a low false alarm probability at the wrong delay. Typically, the length of the correlation, measured as a multiple N of the chip duration $T_c$ is between 500 $T_c$ and 20000 $T_c$.

To make the correlations even more efficient, the dual dwell algorithm is used. At each delay in the window, the correlation is performed for a number M of chip durations that is less than N. Only if the correlation value after M chip durations exceeds a certain threshold is the correlation performed for the full N chip durations. The threshold, and the parameters N and M, are chosen to maximize the detection probability while minimizing both the false alarm probability and the time spent correlating. See, for example, M. K. Simon, J. K. Omura, R. A. Scholtz and B. K.

Levitt, Spread Spectrum Communication, Vol. III, Computer Science Press, 1989, chapter 1, particularly section 1.3, and D. M. Dicarlo and C. L. Weber, "Multiple dwell serial search: performance and application to direct sequence code acquisition", IEEE Transactions on Communications vol. COM-31 no. 5 pp. 650–659, May 1983. In the prior art implementation of this algorithm, several correlators are used by searcher 80 to correlate the received pilot signal with the PN sequence at several adjacent delays in the window. If none of the correlation values exceeds the threshold after M chip durations, then the correlators are used to correlate the received pilot signal with the PN sequence at the next several adjacent delays. If at least one of the correlation values exceeds the threshold after M chip durations, then all the correlations are continued for the full N chip durations, but only the correlation values obtained by the correlators whose correlation values exceeded the threshold after the initial M chip durations are actually considered. The brute force approach to reducing search time, adding more correlators, is inefficient, because the more correlators that are used, the more likely it is that one of the correlators passes the threshold. In that case, the other correlators, which did not pass the threshold, continue to correlate unnecessarily for the full N chip durations.

There is thus a widely recognized need for, and it would be highly advantageous to have, a configuration for a cellular telephony searcher that would allow the efficient use of many correlators.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a cellular telephony searcher which can be used by a mobile station to identify the several strongest multipath components of nearby base stations faster than presently known searchers.

The principles and operation of a cellular telephony searcher according to the present invention may be better understood with reference to the drawings and the accompanying description.

Figure 1:
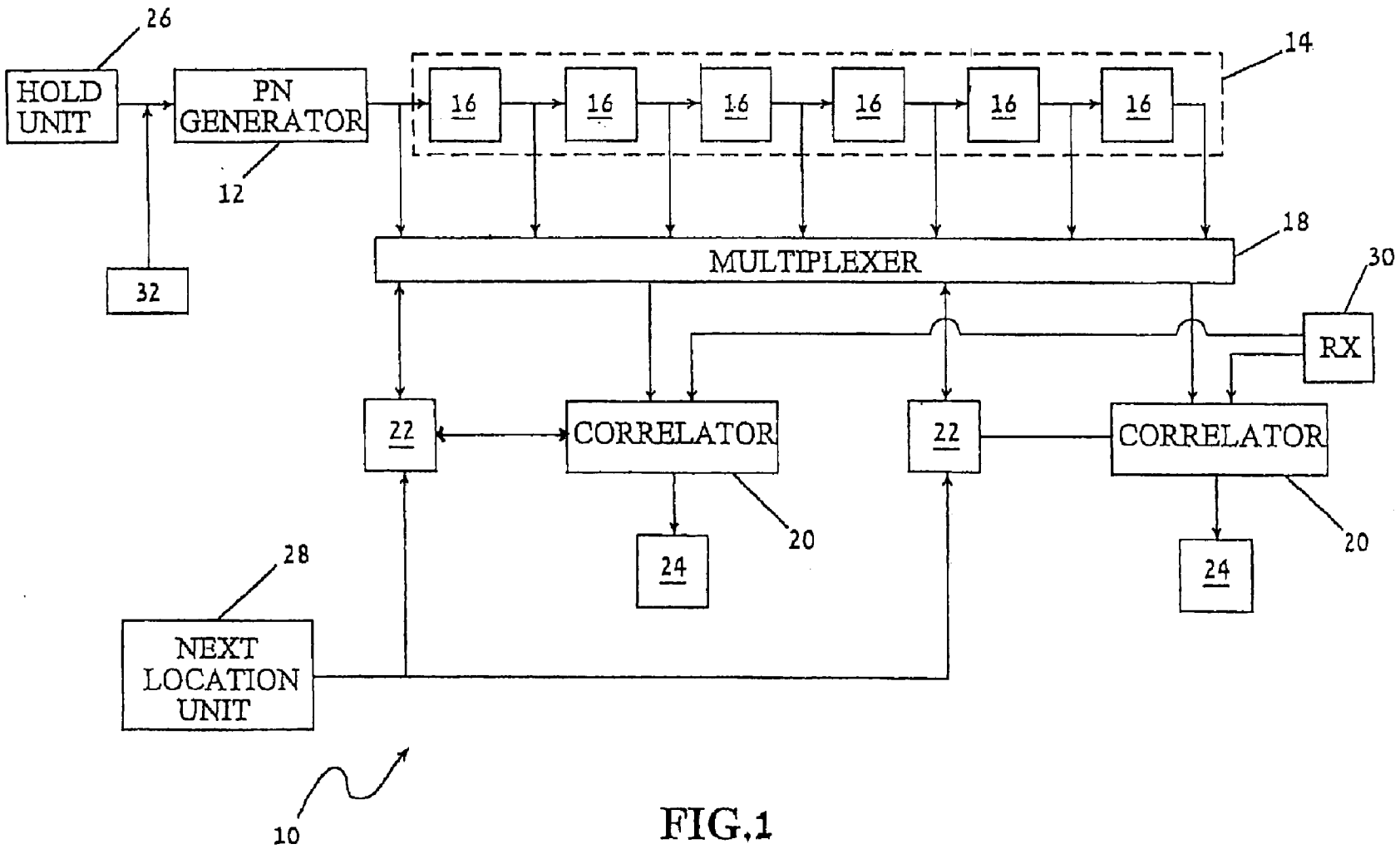
FIG. 1 is a partial block diagram of a searcher of the present invention.

Referring now to the drawings, FIG. 1 is a partial block diagram of a searcher 10 of the present invention. Searcher 10 includes a PN sequence generator 12, a delay line 14 that in turn includes several complex delay units 16, a multiplexer 18, several correlators 20, a hold unit 26 and a next location unit 28. With each correlator 20 is associated an index register 22 and a memory 24. Memory 24 includes several complex registers and several corresponding integer registers, as discussed below. For illustrational simplicity, only two correlators 20 are shown, and only six delay units 16 are shown in delay line 14. In practice, the preferred number of correlators 20 is at least 8. The preferred number of delay units 16 is discussed below.

Also shown in FIG. 1 is a receiver 30 and a clock 32.

Figure 3:
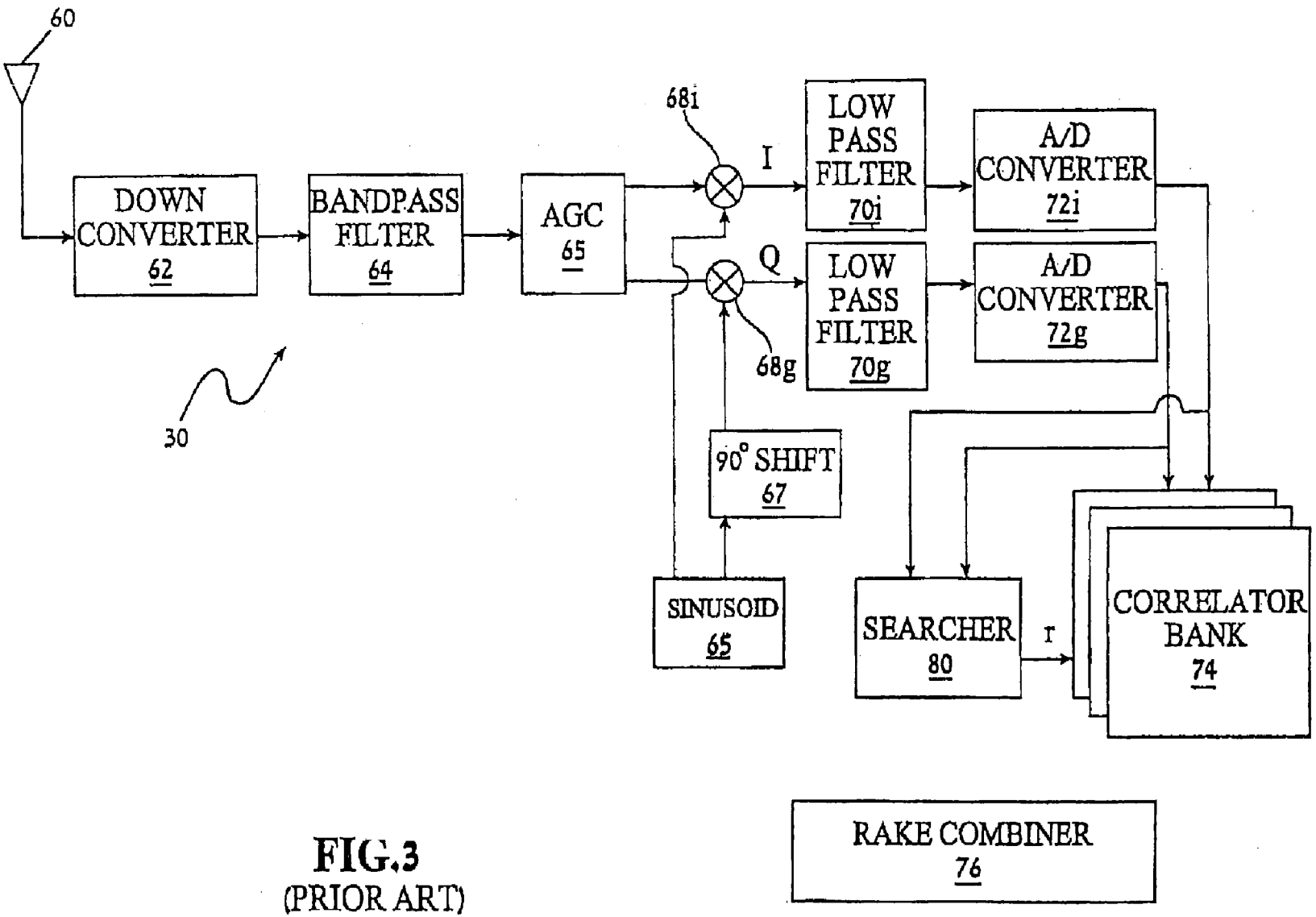
FIG.3 (PRIOR ART)
FIG. 3 (prior art) is a schematic block diagram of the receiver of a cellular telephony mobile unit.

Block 30 of FIG. 1 represents prior art receiver 30 of FIG. 3, except for searcher 80; and, in fact, according to the present invention, searcher 10 substitutes directly for searcher 80 in receiver 30 of FIG. 3. The calculation performed by each correlator 20 is $$S_K(v, \gamma) = \sum_{k=1}^{K} RX_{k+v} PN^*_{k+v-y} \tag{4}$$

where the $RX_k$ are successive values of the received signal of equation (3), the $PN_k$ are successive values of the PN sequence received by correlator 20 from PN sequence generator 12, and the summation index k runs from 1 to an upper limit K. The received signal is not necessarily sampled at the same rate as the PN sequence. In the examples presented herein, new samples $RX_k$ are provided to correlators 20 by A/D converters 72 at time intervals of $T_c/2$. The parameter v represents the time at which the correlation performed by a particular correlator 20 starts. The parameter γ represents the delay at which the correlation is performed, relative in the time at which the correlation starts. The samples $RX_k$ and $PN_k$ are complex, and the asterisk represents complex conjugation: $PN_k^*$ is the complex conjugate of $PN_k$. For example, in a searcher 10 with four correlators, the correlation performed initially by the first correlator 20 is:

$$S=RX(0)PN(0)+RX(T_c)PN(T_c)+RX(2T_c)PN(2T_c)+ RX(3T_c)PN(3T_c)+ \ldots \tag{5}$$

the correlation performed initially by the second correlator 20 is:

$$S=RX(T_c/2)PN(0)+RX(3T_c2)PN(T_c)+RX(ST_c/2)PN(2T_c)+ RX(7T_c2)PN(3T_c)+ \ldots \tag{6}$$

the correlation performed initially by the third correlator 20 is:

$$S=RX(T_c)PN(0)+RX(2T_c)PN(T_c)+RX(3T_c)PN(2T_c)+ RX(4T_c)PN(3T_c)+ \ldots \tag{7}$$

and the correlation performed initially by the fourth correlator 20 is:

$$S=RX(3T_c/2)PN(0)+RX(ST_c/2)PN(T_c)+RX(7T_c/2)PN(2T_c)+ RX(9T_c/2)PN(3T_c)+ \ldots \tag{8}$$

(In equations (5)–(8), RX and PN are shown as functions of time, rather than as sampled values.) Note that correlators 20 do not all start correlating at the same time. In this example, the first correlator 20 starts correlating at time t=0; the second correlator 20 starts correlating at time $t=T_c/2$; the third correlator 20 starts correlating at time $t=T_c$; and the fourth correlator 20 starts correlating at time $t=3T_c/2$. Note also that, in this example at least, each correlator 20 receives the PN sequence with a delay corresponding to the time at which that correlator 20 starts its calculation. After M chip durations $T_c$(K=M), $S_k=S_M$ is the first dwell correlation value. After N chip durations $T_c$(K=M), $S_K S_M$ is the second dwell correlation value.

Similarly, clock 32 is not part of searcher 10, but is the system clock of the mobile station of which searcher 10 is a high level component. Clock 32 drives PN sequence generator 12 under the control of hold unit 26, as described below.

PN sequence generator 12 produces a new value $PN_k$ every chip duration $T_c$. Each new term in the right hand side of equation (4) also is computed by each correlator 20 once every $T_c$. In any particular $T_c$ interval, all correlators 20 receive from A/D converters 72 one of two different values $RX_k$ but each correlator 20 receives from PN sequence generator 12, via delay line 14 and multiplexer 18, a different value $PN_k$, depending on the value of an index stored in index register 22 associated with that correlator 20.

Conceptually, once every $T_c$ interval, each correlator 20 performs the multiplication $RX_kPN_k^*$ and adds the complex product thus obtained to a correlation value stored in one of the complex registers in memory 24 associated with that correlator 20. Because the possible values of the $PN_k$ samples are either +1 or −1, there is no need to actually perform multiplications. Instead; only additions or subtractions of the in-phase and quadrature components of $RX_k$ are actually performed. This allows a significant reduction in the complexity and electrical current consumption of searcher 10.

For example, let $A=Re(RX_k)+Im(RX_k)$ and let $B=Re(RX_k)-Im(RX_k)$. If $Re(PN_k)=1$ and $Im(PN_k)=1$, then $Re(RX_kPN_k^*)=A$, and $Im(RX_kPN_k^*)=-B$. If $Re(PN_k)=1$ and $Im(PN_k)=-1$, then $Re(RX_kPN_k^*)=B$ and $Im(RX_kPN_k^*)=A$. If $Re(PN_k)=-1$ and $Im(PN_k)=-1$, then $Re(RX_kPN_k^*)=-B$ and $Im(RX_kPN_k^*)=-A$. If $Re(PN_k^*)=-1$ $Im(PN_k)=-1$, then $Re(RX_kPN_k^*)=-A$ and $Im(RX_kPN_k^*)=B$. Instead of transferring $RX_k$ directly from receiver 30 to correlators 20, $RX_k$ is sent to an arithmetic unit (not shown) that computes A and B and sends A and B to the appropriate correlators 20. Each correlator 20 then adds ±A or ±B to the real part and the imaginary part of the correlation value, depending on the signs of the values of $Re(PN_k)$ and $Im(PN_k)$ concurrently provided by multiplexer 18 to that correlator 20.

Another method of avoiding actual multiplications exploits the fact that only the absolute values of the correlation values S are actually needed, to further reduce the number of calculations and achieve a further reduction in electrical current consumption by searcher 10. If the complex PN sequence of every correlator 20 is rotated 45°, then either the real part or the imaginary part of every $PN_k$ sample is equal to zero. Each correlator 20 then adds either $\pm Re(RX_k)$ or $\pm Im(RX_k)$ to the real part or the imaginary part of S, depending on the sign of the non-zero component of $PN_k$, without the intervention of the arithmetic unit. The rotation as described implicitly divides the complex PN sequence by the square root of 2. If only the relative values of S are required, then the system software uses these values of S as produced by correlators 20. If the absolute values of S are needed, then the system software normalizes the values of S that it obtains from searcher 10 by multiplying those values by the square root of 2.

Each delay unit 16 receives the PN sequence, either directly from PN sequence generator 12 in the case of the first (leftmost) delay unit 16, or from the immediately preceding delay unit 16. Each delay unit passes the PN sequence, with a fixed delay D, to multiplexer 18 and (except for the last (rightmost) delay unit 16) to the next delay unit 16. PN sequence generator 12 also passes the PN sequence directly to multiplexer 18. Thus, if there are $N_D$ delay units 16 in delay line 14, multiplexer 18 receives $N_D+1$ copies of the PN sequence, with mutual relative delays D. The size of D, and the sampling rate at which $RX_k$ samples are provided to correlators 20, are selected to give searcher 10 the required time resolution. In the example of equations (5)–(8), in which the sampling rate of $RX_k$ is $(T_c/3)^{-1}$, the time resolution of searcher 10 is $T_c/2$.

Searcher 10 functions under the overall control of the system software to search for the delays, in all the relevant windows, that give correlation values that are significantly meaningful (i.e., above background noise) to be useful in identifying the strong neighboring base stations and in demodulating the signals received from these base stations. For each window, the search process is initialized by setting the delay of PN sequence generator 12 to the first (earliest) delay in the window, by setting the indices stored in index registers 22 to values corresponding to the first L delays in the window (L being the number of correlators 20), and by zeroing the complex registers of memories 24. Subsequently, hold unit 26 delays PN sequence generator 12 further, as described below. In all cases, hold unit 26 delays PN sequence generator 12 by blocking timing signals from clock 32.

Figure 2:
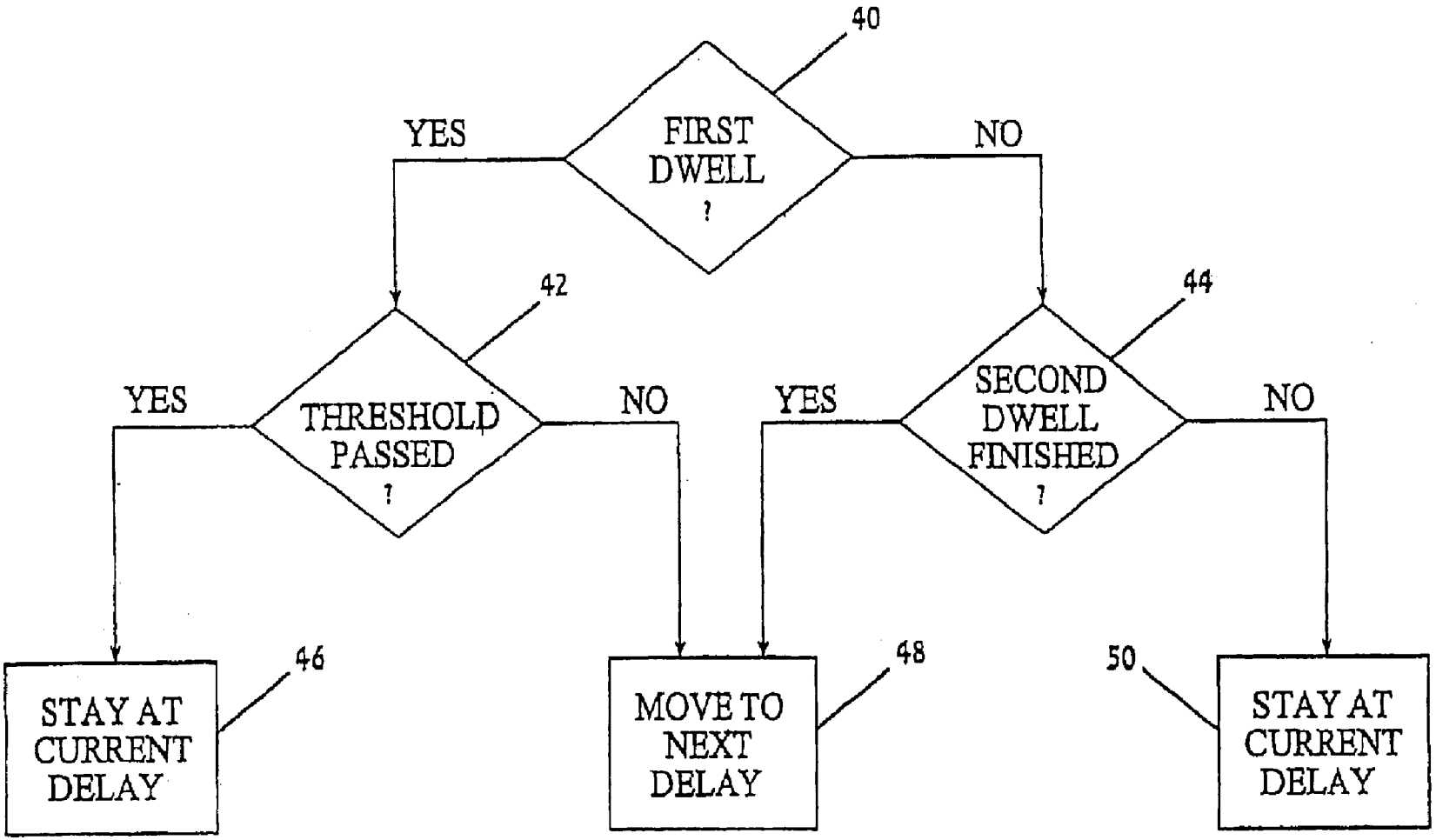
FIG. 2 is a flow chart for the decision of whether to move a correlator to a new delay.

Whenever a correlator 20 finishes a correlation over M chip intervals, next location unit 28 decides whether that correlator 20 should continue correlating at its current delay or should move to the next delay. FIG. 2 is a flow chart of this decision. If K=M (block 40), correlator 20 has finished the first dwell correlation, so the absolute value of $S_K=S_M$ is compared to the first dwell threshold (block 42). If $|S_M|$ is less than or equal to the first dwell threshold, the correlation at the current delay has failed, so correlator 20 is moved to the next delay that needs to be tested (block 48). If $|S_M|$ exceeds the first dwell threshold, then correlator 20 stays at the current delay (block 46) and continues the summation of equation (4) until N terms $RX_kPN_k^*$ have been summed. If K>M (block 40), then, in the general case of N>2M, either correlator 20 is in the middle of computing the second dwell correlation value $S_N$(K<N) or correlator 20 has finished computing the second dwell correlation value (K=N)(block 44) If correlator 20 is in the middle of computing SN, then correlator 20 remains at the current delay (block 50). Otherwise, correlator 20 is moved to the next delay that needs to be tested.

In the special case of N=2M, K>M implies K=N, so the "no" branch of block 40 leads directly to block 48.

Most preferably, the exact absolute value of $S_M$ is not compared to the threshold. Instead the following piecewise linear approximation of $|S_N|$, which is based on a linear approximation of $\sqrt{1+x^2}$, and which is easier to implement in hardware than an exact numerical calculation of the absolute values of $S_M$, is used for the absolute value of $S_M$.

$$|S_M=\max(|Re(S_M)|_p|Im(S_M)|)+\min(|Re(S_M)|_p|Im(S_M)|)/4 \quad (9)$$

This approximation is sufficiently accurate for first dwell thresholding, and allows the implementation of the first dwell threshold decision in a hardware unit that is smaller, and consumes less electrical current, than would otherwise be necessary. By contrast, the exact absolute values of $S_N$ is computed, for trial delays that pass the first dwell threshold, in software, so that the various $|S_N|$'s can be compared to determine the delays with the largest $|S_N|$s. The fact that only a small number of trial delays pass the first dwell threshold keeps the associated computational load on the system software relatively low, with no sacrifice in accuracy.

Recall that each memory 24 includes several complex registers for storing $S_K$. The register depth, i.e., the number R of complex registers, depends on how often (multiple of $MT_c$) an interrupt is generated to allow the reading of the most recently calculated value of S and the reading of the index value in the associated integer register. For example, if the interrupt is generated every $2MT_c$, then R should be at least 2, and in general if the interrupt is generated every $yMT_c$ (y being an integer) then R should be at least as great as y. If y<R, then the R complex registers are activated cyclically, giving the system software more time to respond to interrupts. R and y are implementation-dependent parameters. There are several considerations in the selection of the optimum values of y and R. Values of y and R that are too small put too much of a burden on system software. Large values of y and R require a correspondingly long delay time and a larger chip area devoted to memories 24. The preferred value of both R and y is 2. Most preferably, to minimize the burden on system software, an interrupt is issued to system software only when all correlators 20 have filled their respective memories 24.

Next location unit 28 also includes a next location register. At the start of correlation in a given window, the value in the next location register is set to the index corresponding to the first delay after the initial L delays. Subsequently, whenever block 48 is reached for a given correlator 20, the value stored in the next location register is:

(a) copied to index register 22 of that correlator 20 and then (b) changed to the index corresponding to the delay immediately following the delay to which that correlator 20 has now been set.

Every yM chip intervals, while the interrupt service routine reads the output of searcher 10, the system software determines the delay of the locally generated PN sequence that is to be used now by each correlator 20, and signals hold unit 26 to pause PN sequence generator 12 until the timing of the generation of the PN sequence by PN sequence generator 12 matches the earliest delay of the forthcoming M chip intervals. At the same time, multiplexer 18 shifts the input of the PN sequence to each correlator 20 correspondingly, to preserve the continuity of input to each correlator 20. This allows the use of a delay line 14 that is much shorter than the window. Specifically, the minimum values of $N_D$, the number of delay units 16 in delay line 14, is $$\frac{L}{2}\frac{N}{M}+\Delta$$

where Δ is an implementation dependent parameter: Δ=Ly/2, where y is the interrupt interval factor defined above.

Preferably, the components illustrated in FIG. 1 all are implemented in hardware. The details of such a hardware implementation will be obvious to those skilled in the art.

The following is an example of the functioning of searcher 10, with L=8 correlators 20 and with $D=T_c/2$, M=512, N=3M=1536 and y=2. In this example, the value of the indices in index registers 22 and in the next location register of next location unit 28 are given as (possibly fractional) multiples of $T_c$. In practice, because index registers 22 are integer registers, the values actually stored in index registers 22 are appropriate integral multipliers of D. Similarly, the delays are expressed as multiples of $T_c$ relative to the center of the window. A correlator 20 is said to "fail the first dwell threshold" if that correlator 20 produces a first dwell correlation value $S_M$ less than or equal in absolute value to the first dwell threshold, and to "pass the first dwell threshold" if that correlator 20 produces a first dwell correlation value $S_M$ having an absolute value greater than the first dwell threshold. All correlators 20 have two complex registers in memories 24 for accumulating correlation values.

Following the IS-95 standard, the first correlation is performed at a delay of −30.

TABLE 1

Status at Time = 0

| correlator no. | status | new index value | corresponding delay | new value in next location register |
|---|---|---|---|---|
| 1 | | 0 | −30 | |
| 2 | | ½ | −29½ | |
| 3 | | 1 | −29 | |
| 4 | | 1½ | −28½ | |
| 5 | | 2 | −28 | |
| 6 | | 2½ | −27½ | |
| 7 | | 3 | −27 | |
| 8 | | 3½ | −26½ | 4 |

TABLE 2

Status at time = 512 $T_c$

| correlator no. | status | new index value | corresponding delay | new value in next location register |
|---|---|---|---|---|
| 1 | fail threshold | 4 | −26 | 4½ |
| 2 | fail threshold | 4½ | −25½ | 5 |
| 3 | fail threshold | 5 | −25 | 5½ |
| 4 | fail threshold | 5½ | −24½ | 6 |
| 5 | fail threshold | 6 | −24 | 6½ |
| 6 | pass threshold | 6½ | −23½ | 7 |
| 7 | fail threshold | 7 | −23 | 7½ |
| 8 | fail threshold | 7½ | −22½ | 8 |

Note: All the correlators have failed the first dwell threshold. Therefore, all the index registers are incremented by 4.

TABLE 3

Status at time = 102.4$T_c$

| correlator no. | status | new index value | corresponding delay | new value in next location register |
|---|---|---|---|---|
| 1 | fail threshold | 8 | −22 | 8½ |
| 2 | fail threshold | 8½ | 22½ | 9 |
| 3 | pass threshold | 5 | −25 | 9 |
| 4 | fail threshold | 9 | −21 | 9½ |
| 5 | fail threshold | 9½ | −20½ | 10 |
| 6 | pass threshold | 6½ | −23½ | 10 |
| 7 | fail threshold | 10 | −20 | 10½ |
| 8 | fail threshold | 10½ | −29½ | 11 |

Note: Correlators 3 and 6 have passed the first dwell threshold. Therefore, these two correlators remain at their old delays, to continue correlating for the second dwell time. The other correlators, having failed the first dwell threshold, are set to the next delays.

Now, an interrupt is generated. Hold unit 26 performs a hold of $5T_c$, which is delay of the earliest correlator (correlator 3) relative to the start of the window, and 5 is subtracted from all the index values and from the value in the next location register.

TABLE 4

Status at time = $1536T_c$

| correlator no. | status | new index value | corresponding delay | new value in next location register |
|---|---|---|---|---|
| 1 | fail threshold | 6 | −19 | 6½ |
| 2 | fail threshold | 6½ | −18½ | 7 |
| 3 | continue (2nd) | 0 | −25 | 7 |
| 4 | fail threshold | 7 | −18 | 7½ |
| 5 | fail threshold | 7½ | −37½ | 8 |
| 6 | continue (2nd) | 2½ | −23½ | 8 |
| 7 | fail threshold | 8 | −37 | 8½ |
| 8 | pass threshold | 5½ | −19½ | 8½ |

Note: Correlator 8, which has passed the first dwell threshold, and correlators 3 and 6, which are correlating in the second dwell time, are kept at their old delays. The other correlations are set to the next delays.

TABLE 5

Status at time = $2048T_c$

| correlator no. | status | new index value | corresponding delay | new value in next location register |
|---|---|---|---|---|
| 1 | fail threshold | 8½ | −16½ | 9 |
| 2 | fail threshold | 6½ | −18½ | 9 |
| 3 | continue (3rd) | 0 | −25 | 9 |
| 4 | fail threshold | 9 | −16 | 9½ |
| 5 | fail threshold | 9½ | −25½ | 10 |
| 6 | continue (3rd) | 1½ | −23½ | 10 |
| 7 | fail threshold | 10 | −15 | 10½ |
| 8 | continue (2nd) | 5½ | −19½ | 10½ |

Note: Correlator 2, which has passed the first dwell threshold, and correlators 3, 6 and 8, which are correlating in the second dwell time, are kept at their old delays. The other correlations are set to the next delays.

An interrupt is generated, but no hold is performed because the earliest correlator still is correlator 3.

TABLE 6

Status at time = $2560T_c$

| correlator no. | status | new index value | corresponding delay | new value in next location register |
|---|---|---|---|---|
| 1 | fail threshold | 10½ | −14½ | 11 |
| 2 | continue (2nd) | 6½ | −18½ | 11 |
| 3 | finish (new location) | 11 | −14 | 11½ |
| 4 | fail threshold | 11½ | −13½ | 12 |
| 5 | fail threshold | 12 | −13 | 12½ |
| 6 | finish (new location) | 12½ | −12½ | 13 |
| 7 | fail threshold | 13 | −12 | 15½ |
| 8 | continue (3rd) | 5½ | −19½ | 10½ |

Note: Correlator 2 and 8, which are correlating in the second dwell time, remain at their old delays. The other correlators, which either have failed the first dwell thresold or have completed the full first and second dwell correlations, are set to the next delays. In correlators 3 and 6, the active memory registers now store $S_N$, the second dwell correlations value.

TABLE 7

Status at time = $3072T_c$

| correlator no. | status | new index value | corresponding delay | new value in next location register |
|---|---|---|---|---|
| 1 | fail threshold | 13½ | −11½ | 14 |
| 2 | continue (3rd) | 6½ | −18½ | 13 |
| 3 | fail threshold | 14 | −11 | 14½ |
| 4 | pass threshold | 11½ | −13½ | 14½ |
| 5 | fail threshold | 14½ | −10½ | 15 |
| 6 | pass threshold | 12½ | −12½ | 15 |
| 7 | fail threshold | 15 | −20 | 15½ |
| 8 | finish (new location) | 15½ | −8½ | 16 |

An interrupt is again generated by $S_N$ is read from the inactive complex registers of the memories of correlators 3 and 6. The corresponding indicas are read from the corresponding integer registers of the memories of correlators 3 and 6. Hold unit 26 performs a hold of $6_c$ because the earliest correlator (correlator 2) is advanced by $13T_c/2$ relative to PN sequence generator 12. Correspondingly, 6 is subtracted from all of the index values and from the value in the next location register.

The operations performed by searcher 10 are partitioned between hardware and software in a manner that makes optimal use of the relative strengths and weaknesses of hardware and software. Specifically, operations associated with high current consumption are implemented in hardware, and numerically intensive operations are implemented in software. The exceptions are numerically intensive operations that are performed frequently, for example, the approximate computation of $|S_M|$ according to equation (9), which also are performed in hardware. The sorting of $S_N$ values to find the test delays that pass the second dwell threshold, and the pausing of PN generator 12, also are done by software.

While the invention has been described with respect to a limited number of embodiments, it will be appreciated that many variations, modifications and other applications of the invention may be made.

What is claimed is:

1. A cellular telephony searcher comprising:

a plurality of correlators for correlating a received signal with a pseudonoise sequence;

an input mechanism for inputting said pseudonoise sequence into said correlators, each of said correlators receiving said pseudonoise sequence with a different delay; and a delay management mechanism for initializing said delays and subsequently changing said delays, said changing being contingent, for each said correlator, only on an output of said each correlator.

2. The searcher of claim 1, wherein each said correlator correlates said received signal with said pseudonoise sequence at said respective delay for a correlation time selected from the group consisting of a first dwell time and a sum of said first dwell time and a second dwell time, said selection being performed separately for each said correlator.

3. The searcher of claim 1, wherein, for each said correlator, said delay management mechanism changes said delay corresponding to said each correlator if an estimated absolute value of said output of said each correlator is less than a threshold common to all said correlators, independent of an estimated absolute value of said output of any other said correlator.

4. The searcher of claim 1, wherein said input mechanism includes:

a pseudonoise sequence generator for generating said pseudonoise sequence; and a delay line for receiving said pseudonoise sequences and outputting a plurality of copies of said pseudonoise sequence, each said copy being outputted with a different said delay.

5. The searcher of claim 4, wherein said delay management mechanism includes:

for each said correlator, an index register; and a multiplexer for directing one of said copies of said pseudonoise sequence to each said correlator in accordance with an index value stored in said index register of said each correlator.

6. In a cellular telephony network including at least one base station and at least one mobile station, each of the at least one mobile station receiving a received signal from the at least one base station, the received signal including a plurality of received values, each said received value having a real part and an imaginary part, a method for each of the at least one mobile station to identify at least one multipath channel to use to communicate with one of the at least one base station, comprising:

generating a pseudonoise sequence;

simultaneously performing a plurality of initial correlations of the received signal with said pseudonoise sequence, each of said initial correlations being performed with a different initial delay of said pseudonoise sequence, said initial correlations being performed for a first dwell time to produce, for each of said initial correlations, an initial first dwell time correlation value; and for each said initial correlation;

if an estimated absolute value of said initial first dwell time correlation value exceeds a threshold, continuing to perform said each initial correlation, otherwise, performing a first subsequent correlation of the received signal with said pseudonoise sequence at a first subsequent delay different from any of said initial delays;

wherein, if said performing of at least one of said initial correlations is continued and if at least one of said first subsequent correlations is performed, said continued performing of said at least one initial correlation and said performing of said at least one first subsequent correlation are effected simultaneously.

7. The method of claim 6, wherein, if a plurality of said first subsequent correlations are performed, said first subsequent delays all are mutually different.

8. The method of claim 6, wherein said continued performing of said initial correlations is effected for a second dwell time to produce a second dwell time correlation value.

9. The method of claim 8, wherein said second dwell time is an integral multiple of said first dwell time.

10. The method of claim 6, wherein successive said initial delays differ by a common increment.

11. The method of claim 10, wherein said pseudonoise sequence includes a plurality of chips generated at a certain chip interval, and wherein said common increment is an integral fraction of said chip interval.

12. The method of claim 6, wherein said first subsequent correlations are performed for said first dwell time to produce, for each of said first subsequent correlations, a subsequent first dwell time correlation value, the method further comprising:

for each said first subsequent correlation:

if an estimated absolute value of said subsequent first dwell time correlation value exceeds a threshold, continuing to perform said each first subsequent correlation;

otherwise, performing a second subsequent correlation of the received signal with said pseudonoise sequence at a second subsequent delay different from any of said initial delays and from any of said first subsequent delays.

13. The method of claim 12, wherein, if said performing of at least one continued correlation, selected from the group consisting of said initial correlations and said first subsequent correlations, is continued, and if at least one of said second subsequent correlations is performed, said continued performing of said at least one continued correlation and said performing of said at least one second subsequent correlation are effected simultaneously.

14. The method of claim 6, further comprising:

if, after said simultaneous initial correlations are completed up to said first dwell time, all of said delays, whereat said initial correlations are continued and whereat said first subsequent correlations are performed, exceed a shortest initial delay, pausing said generating of said pseudonoise sequence.

15. The method of claim 14, wherein said pausing of said generating of said pseudonoise sequence is effected for a difference between a shortest said delay, whereat said initial correlations are continued and whereat said first subsequent correlations are performed, and said shortest initial delay.

16. The method of claim 6, wherein said correlations are performed using only arithmetical operations selected from the group consisting of additions and subtractions.

17. The method of claim 16, wherein each said correlation is performed as a sum of a plurality of terms, each said term being selected from the group consisting of the real part of a corresponding received value, a negative of the real part of said corresponding received value, the imaginary part of said corresponding received value, and a negative of the imaginary part of said corresponding received value.

18. The method of claim 16, further comprising:

normalizing said correlations.

19. The method of claim 16, wherein each said correlation is performed as a sum of a plurality of terms, each said term being selected from the group consisting of a sum of the real part of a corresponding received value and the imaginary part of said corresponding received value, a negative of said sum of the real part of said corresponding received value and the imaginary part of said corresponding received value, a difference of the real part of said corresponding received value and the imaginary part of said corresponding received value, and a negative of said difference of the real part of said corresponding received value and the imaginary part of said corresponding received value.

20. The method of claim 6, further comprising:

rotating said pseudonoise sequence by 45° prior to performing said correlations.

21. The method of claim 20, further comprising:

normalizing said correlations.

22. The method of claim 6, wherein said estimated absolute value of said initial first dwell time correlation value is a piecewise linear approximation of an exact absolute value of said initial first dwell time correlation value.

23. The method of claim 22, wherein said piecewise linear approximation is a piecewise linear combination of a larger of an absolute value of a real part of said initial first dwell time and an imaginary part of said initial first dwell time with a smaller of said absolute value of said real part of said initial first dwell time and said absolute value of said imaginary part of said initial first dwell time.

*24. A wireless communication device comprising:*

*a searcher having at least first and second correlators to correlate a received signal with a pseudonoise sequence provided to the first and second correlators;*

*a delay line operably coupled to a multiplexer to provide at least first and second delays to the pseudonoise sequence provided to the first and second correlators; and*

*a next location unit to decide to change at least the first delay of the first correlator based, at least in part, on an output of the first correlator.*

*25. The wireless communication device of claim 24, wherein at least one correlator of said at least first and second correlators is able to correlate the received signal within a correlation time selected from a group consisting of a first dwell time, and a sum of the first dwell time and a second dwell time.*

*26. The wireless communication device of claim 24, wherein the next location unit is able to decide to change at least the first delay by comparing an estimated absolute value of the output of the first correlator to a threshold.*

*27. The wireless communication device of claim 26, wherein the threshold comprises a first dwell time.*

*28. A method comprising:*

*correlating a received signal with a pseudonoise sequence using two or more correlators; and*

*changing a first delay applied to the pseudonoise sequence of at least one correlator of the two or more correlators independently from a second delay applied to the pseudonoise sequence at one other correlator of the two or more correlators based, at least in part, on an output of said at least one correlator.*

*29. The method of claim 28, wherein correlating comprises:*

*correlating the received signal within a correlation time selected from a group consisting of a first dwell time and a sum of the first dwell time and a second dwell time.*

*30. The method of claim 29, wherein changing comprises changing the first delay by comparing an estimated absolute value of the output of said at least one correlator to a threshold.*

*31. The method of claim 30 further comprising:*

*correlating the received signal within the first dwell time to provide a correlation output;*

*comparing the estimated absolute value of the correlation output to said threshold; and*

*correlating the received signal at the second dwell time if said threshold is exceeded.*

*32. The method of claim 30, wherein changing comprises:*

*changing at least the first delay if said threshold is not exceeded.*

*33. The method of claim 31 comprising:*

*identifying a base station based on the result of correlating the received signal during the second dwell time.*

*34. A cellular communication system comprising:*

*a mobile station including a searcher having at least first and second correlators, wherein at least the first correlator of the at least first and second correlators is able to correlate to a received signal by changing a first delay applied to a pseudonoise sequence of the received signal at the first correlator independently from a second delay applied to said pseudonoise sequence at the second correlator based, at least in part, on an output of said first correlator.*

*35. The cellular communication system of claim 34, wherein the searcher comprises:*

*a delay line operably coupled to a multiplexer to provide at least first and second delays to the pseudonoise sequence provided to the first and second correlators, respectively; and*

*a next location unit to change at least the first delay of the first correlator based, at least in part, on an output of the first correlator.*

*36. The cellular communication system of claim 34, wherein at least one correlator of said at least first and second correlators is able to correlate the received signal within a correlation time selected from a group consisting of a first dwell time, and a sum of the first dwell time and a second dwell time.*

*37. The cellular communication system of claim 35, wherein the next location unit determines whether to change at least the first delay by comparing an estimated absolute value of the output of said at least first correlator to a threshold.*

*38. A communication device comprising:*

*an antenna to receive a signal having a pseudonoise sequence; and*

*a mobile station including a searcher having at least first and second correlators, wherein at least the first correlator of the at least first and second correlators is able to correlate to a received signal by changing a first delay applied to a pseudonoise sequence of the received signal at the first correlator independently from a second delay applied to said pseudonoise sequence at the second correlator based, at least in part, on an output of said first correlator.*

*39. The communication device of claim 38, wherein the searcher comprises:*

*a delay line operably coupled to a multiplexer to provide at least first and second delays to the pseudonoise sequence provided to the first and second correlators, respectively; and*

*a next location unit to decide to change at least the first delay of the first correlator based, at least in part, on an output of the first correlator.*

*40. The communication device of claim 38, wherein at least one correlator of said at least first and second correlators is able to correlate the received signal within a correlation time selected from a group consisting of a first dwell time, and a sum of the first dwell time and a second dwell time.*

*41. The communication device of claim 39, wherein the next location unit us able to decide to change at least the first delay by comparing an estimated absolute value of the output of said at least first correlator to a threshold.*

*42. An article comprising a storage medium, having stored thereon instructions, that when executed, result in:*

*correlating a received signal with a pseudonoise sequence using two or more correlators; and*

*changing a first delay applied to the pseudonoise sequence of at least one correlator of the two or more correlators independently form a second delay applied to the pseudonoise sequence at one other correlator of*

*the two or more correlators based, at least in part, on an output of said at least one correlator.*

*43. The article of claim 42, wherein the instructions when executed, result in:*

*correlating the received signal within a correlation time selected from a group consisting of a first dwell time and a sum of the first dwell time and a second dwell time.*

*44. The article of claim 42, wherein the instruction of changing when executed, result in:*

*changing the first delay by comparing an estimated absolute value of the output of said at least one correlator to a threshold.*

*45. The article of claim 44, wherein the instructions when executed, result in:*

*correlating the received signal within the first dwell time to provide a correlation output;*

*comparing the estimated absolute value of the correlation output to said threshold; and*

*correlating the received signal at the second dwell time if said threshold is exceeded.*

*46. The article of claim 44, wherein the instructions, when executed, result in:*

*changing at least the first delay if said threshold is not exceeded.*

*47. The article of claim 46, wherein the instructions when executed, result in:*

*identifying a base station based on the result of correlating the received signal during the second dwell time.*

* * * * *